United States Patent

[11] 3,593,281

[72] Inventors Hendrik Cornelis Anthony VanDuuren Wassenaar;
Herman Da Silva, Voorburg, both of, Netherlands

[21] Appl. No. 822,189
[22] Filed May 6, 1969
[45] Patented July 13, 1971
[73] Assignee DeStaat der Nederlanden, Ten Deze Vertegenwoordigd Door de Directeur-General der Posterijen, Telegrafie en Telefonie
The Hague, Netherlands
[32] Priority May 10, 1968
[33] Netherlands
[31] 6806678

[54] COMPENSATED AUTOMATIC ERROR CORRECTION TELECOMMUNICATION SYSTEM
6 Claims, 8 Drawing Figs.

[52] U.S. Cl. .......... 340/146.1, 178/23
[51] Int. Cl. .......... H04l 1/18
[50] Field of Search .......... 340/146.1; 178/23.1

[56] References Cited
UNITED STATES PATENTS
2,805,278 9/1957 VanDuuren .......... 340/146.1 X
3,421,147 1/1969 Burton, et al. .......... 340/172.5

*Primary Examiner*—Malcom A. Morrison
*Assistant Examiner*—Charles E. Atkinson
*Attorney*—Hugh Adam Kirk

ABSTRACT: A telecommunication system between two stations involving automatic requests for repetition of received disturbed signals having means for speeding up the normal transmission rate between said stations and providing a storage device of a given capacity at the receiver to store the excess signals until they can be printed. A multivibrator controls the rate at which the signals are taken out of this storing device at the normal rate even when a delay occurs in the faster rate due to requests for repetition. Furthermore, a different counter is provided at the transmitter for determining the number of signals stored in the receiver which counter is controlled by opposing pulse series of the normal and speeded up rates from another multivibrator. Then when the counter determines the storage device is filled, it will stop the transmission of traffic signals and cause the transmitter to transmit an idle time signal until a space is provided in the storage device for more traffic signals.

INVENTORS
H. C. A. VAN DUUREN
H. DA SILVA
BY
Hugh A Kirk
ATTORNEY

INVENTORS
H. C. A. VAN DUUREN
H. DA SILVA
BY
Hugh A. Kirk
ATTORNEY

INVENTORS
H. C. A. VAN DUUREN
H. DA SILVA
BY
Hugh A. Kirk
ATTORNEY

INVENTORS
H. C. A. VAN DUUREN
H. DA SILVA
BY
Hugh A. Kirk
ATTORNEY

INVENTORS
H. C. A. VAN DUUREN
H. DA SILVA
BY
Hugh A. Kirk
ATTORNEY

COMPENSATED AUTOMATIC ERROR CORRECTION TELECOMMUNICATION SYSTEM

In many a telecommunication systems comprising a radio circuit with automatic error correction, the effective transmission speed in reduced by repetitions in the radio path. It is the object of the invention to improve upon such systems by reducing and in most cases eliminating the time required for such repetitions, by speeding up the normal transmission over the radio path.

SUMMARY OF THE INVENTION

The system according to the invention is so arranged that the reduction of the effective transmission speed as a result of repetitions in the radio path is compensated for by the fact that the nominal working speed of the radio circuit is higher than the actual speed in the rest of the telecommunication path. This is accomplished by providing in the transmission path, at the receiving end of the radio circuit, a memory for recording the excess information received during a period of undisturbed transmission, and by providing at the transmission end a difference counter which integrates the difference between the nominal and the actual speeds to measure the amount of information stored at the receiving end. Thus at any instant, the difference counter at the transmitting end determines the difference between the number of signals sent by the transmitter to the receiver and the number of signals delivered to the printer by the receiver, and every time this difference has reached a certain value (determined by the relation of the writing and the reading speeds of the receiving memory and by its size), a pulse is passed to the transmitter to interrupt the current traffic signal transmission for the duration of one signal, and transmit an idle time signal during that interval, a multivibrator in the transmitter is controlled by pulses supplied by a pulse generator at the same rate at which the signal bits are transmitted, and delivers pulses at the rate at which they are sent to the printer in the receiver, then both of these pulse series are applied to the difference counter. Since the traffic signals are stored in a memory provided at the receiving end at the rate at which they are supplied by the transmitter, and since they are delivered by this memory at the rate at which they have to be handled by the printer, a similar multivibrator is provided at the receiver which is controlled by pulses from a pulses generator synchronized by and working at the same rate as the received pulses.

BRIEF DESCRIPTION OF THE VIEWS

The above mentioned and other features, objects, and advantages, and the manner of attaining them are described more specifically below by reference to an embodiment of this invention shown in the accompanying drawings, wherein.

Figure 1:
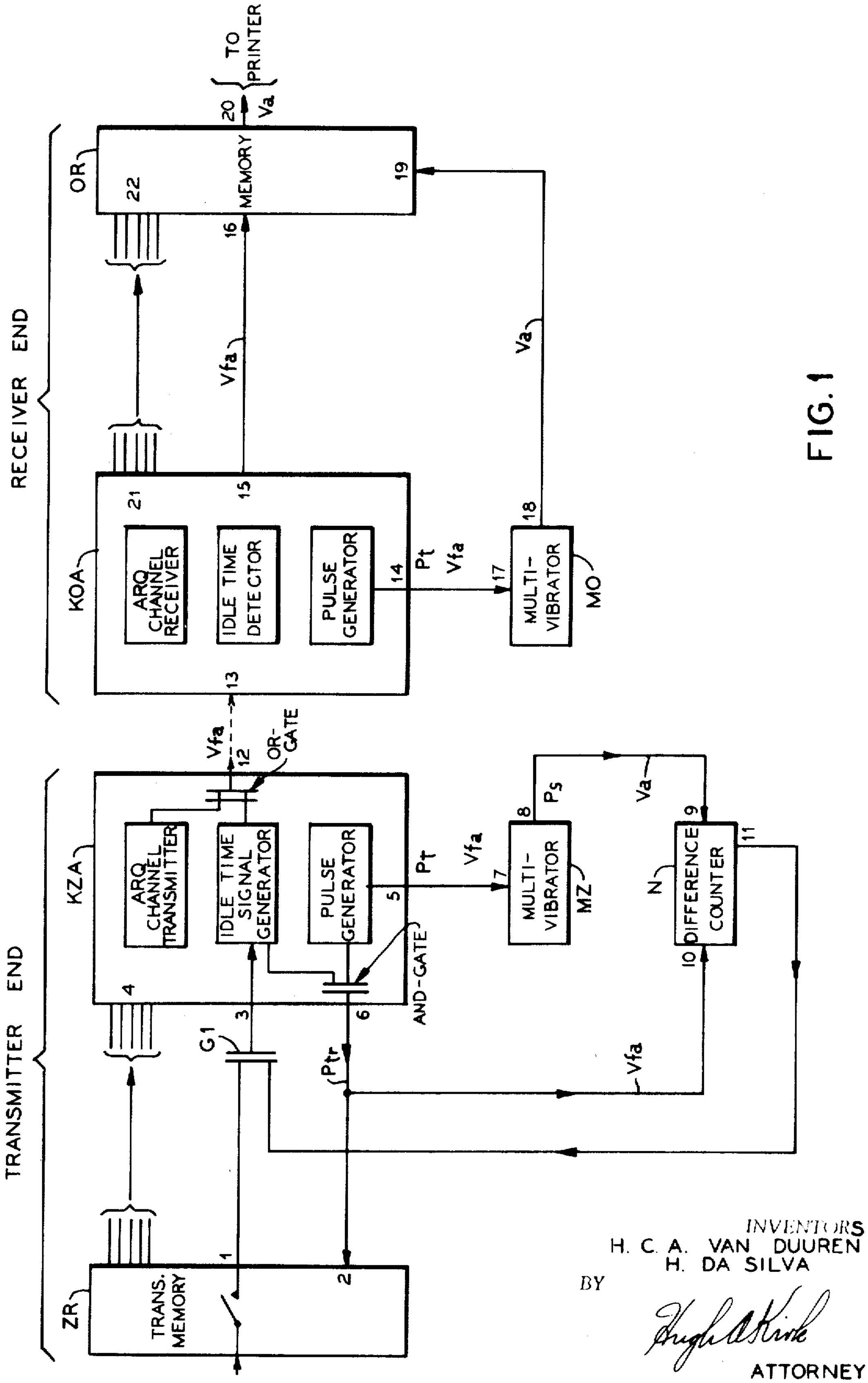
FIG. 1 is a schematic block wiring diagram of an embodiment of the transmitter-receiving system according to this invention.
Figure 5:
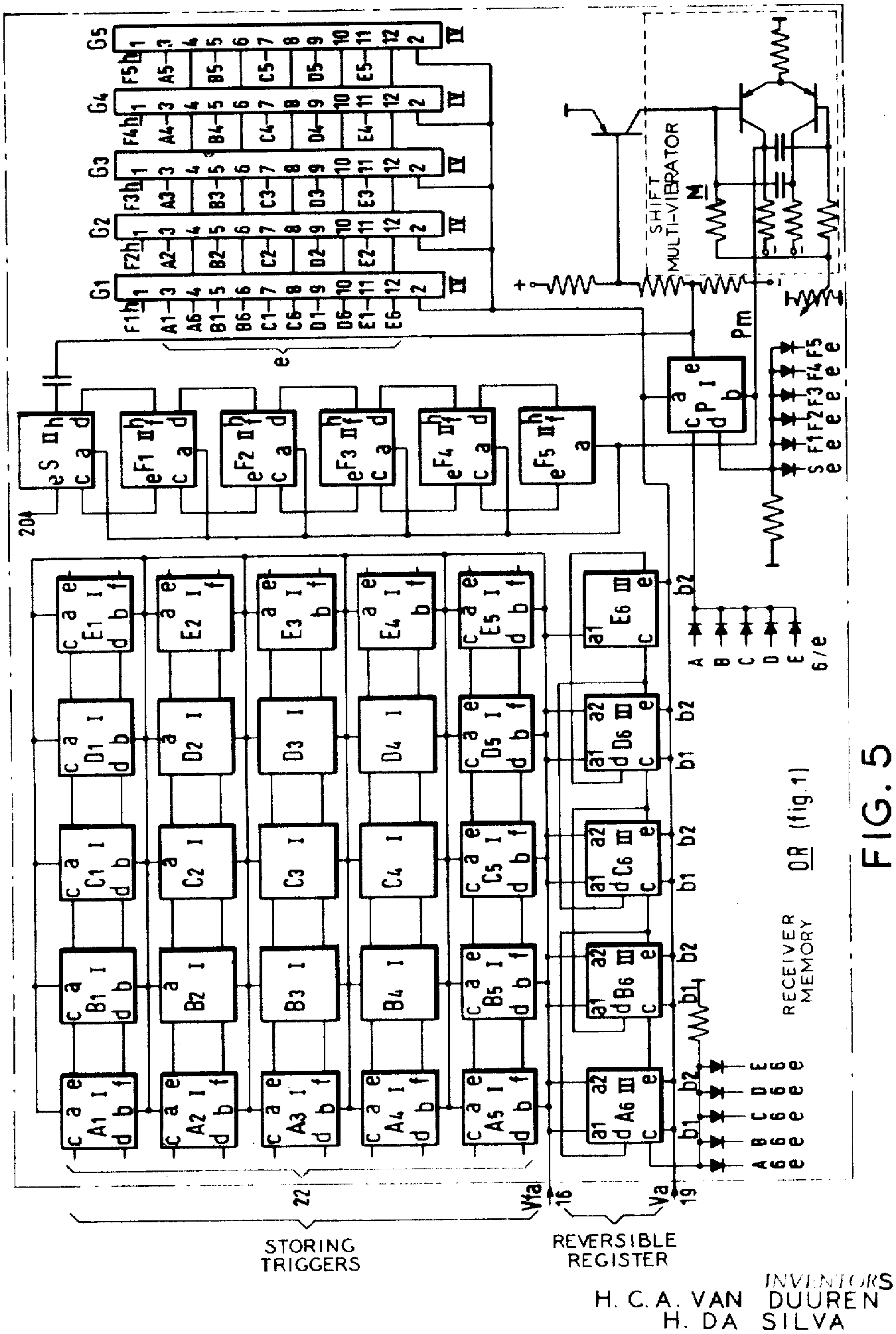
FIG. 5 is a schematic block wiring diagram of the memory circuit at the receiving end shown in FIG. 1.
Figure 7:
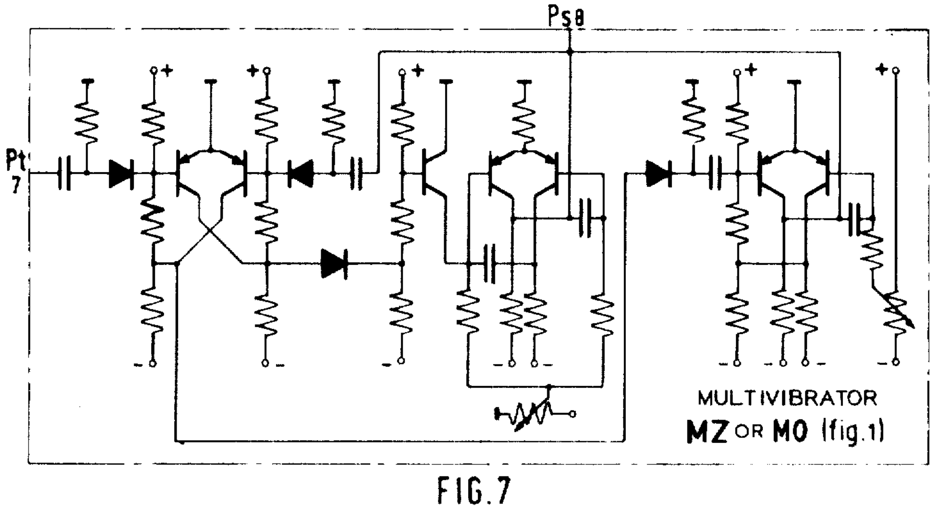
Figure 8:
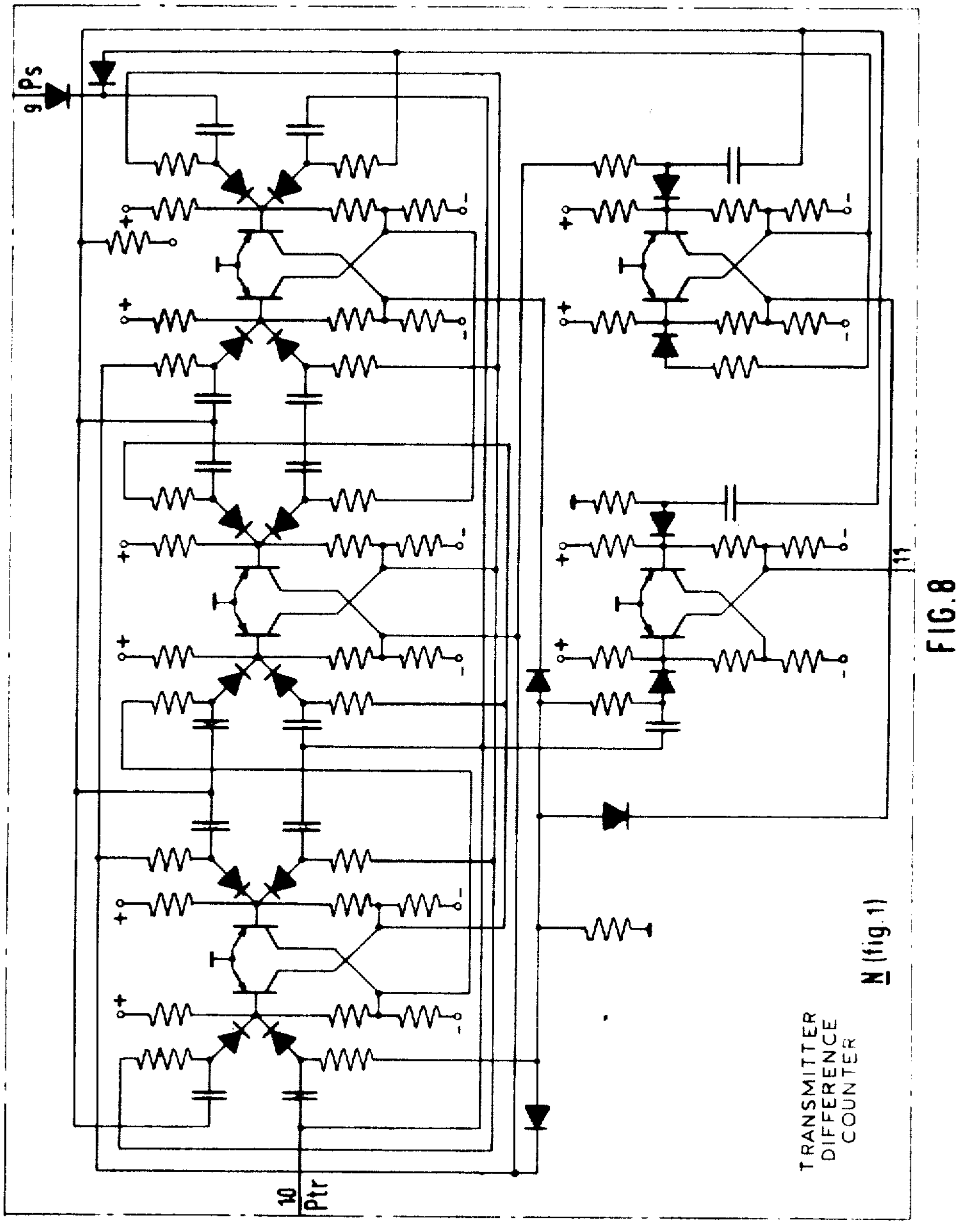

FIG. 6I, 6II, 6III and 6IV are schematic wiring diagrams of the various circuits used in the device shown in FIG. 5, and designated by corresponding Roman Numeral references;

FIG. 7 is a schematic wiring diagram of the multivibrator shown in the transmitter and the receiver according to FIG. 1; and FIG. 8 is a schematic wiring diagram of the difference counter in the transmission of FIG. 1.

DETAILED DESCRIPTION OF PREFERRED EMBODIMENT

In the embodiment, the speed *Va* at which, in the receiver, the signal bits are applied to the printer is 48 bauds, which corresponds to a character cycle duration of 145.8 msec. Further the transmission speed *Vfa* is (5/4) ×48=60 bauds, which corresponds to a cycle duration of (1000/60) ×7 =116.6 msec. (*f* being 5/4).

In view of the speeds chosen and the size of the receiver memory the number of characters that have to be counted in the transmitter difference counter N has been taken to be five, so that the counter can take six states, namely the zero state and five states, corresponding to the number of characters (six) that can be recorded in the memory OR at the receiving end.

This difference counter (see also FIG. 8) N at the transmitting end indicates the state of the register or memory OR at the receiving end, so that an excess of information will not accumulate at the receiving end during a period of undisturbed reception. If no measures were taken, signals would get lost, if at the transmitting end the supply of information would go on uninterruptedly. The difference counter N counts forward (adds up) pluses at the rate *Vfa* (input terminal 10) and counts backward (subtracts) pulses at the rate *Va*.

Figure 2:
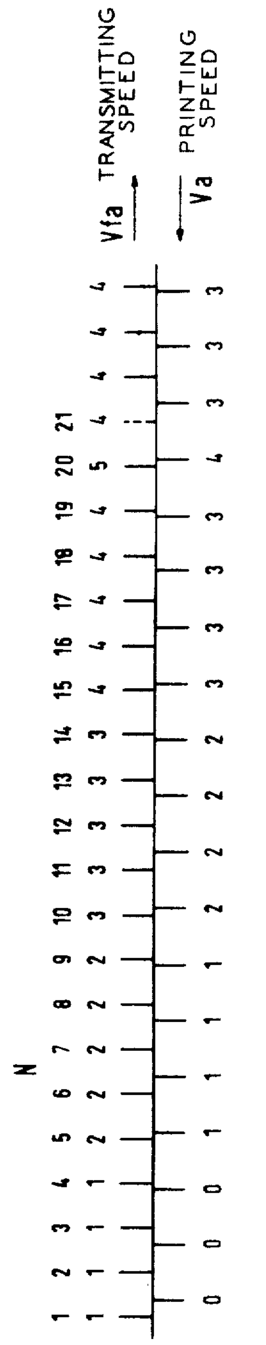
FIGS. 2 and 3 are schematic pulse waveform diagrams showing the course of the difference counting at the transmitting end during undisturbed transmission according to the system shown in FIG. 1.

The speed *Vfa* is equal to the recording speed of the receiver memory OR and the speed *Va* is equal to the speed at which the signals are led from the memory OR (terminal 20) to the printer. When no repetitions occur and no idle time signals are transmitted, the difference counter N reaches the state 5 after the nineteenth signal transmission (see FIG. 2). In this figure the adding pulses appearing at the rate *Vfa* are plotted above, whereas the subtracting pulses appearing at the rate *Va* are plotted below. The result of the counting is indicated by the number at every pulse. When the first *Vfa* pulse appears the counter indicates the result 1. Then there appears a *Va*-pulse, causing the counter to take the O-state again. The second *Vfa* -pulse puts the counter in the 1-state, etc., the further working being self-evident. After 19 character transmissions the counter takes the state 5 at the twentieth character transmission. The *Va*-pulse appearing then brings it back to the state 4. Then, according to the invention, an idle time signai (see dotted pulse) is inserted, because otherwise characters would be lost at the receiving end.

Figure 3:
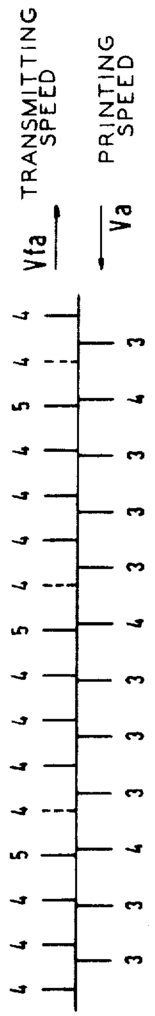

This idle time signal is transmitted at the 21st *Vfa*-pulse and the circuit is so arranged that no pulse goes to the difference counter N at that moment, so that the difference counter N remains in the state 4. This idle time signal is handled by the receiver, but it is not recorded in the memory OR. If the communication remains undisturbed, an idle time signal will have to be inserted again after four more signals (see FIG. 3), as otherwise signals again will be lost in the receiver.

Every time the difference counter N takes the state 5 (see FIG. 3), a voltage is applied via its output terminal 11 to the AND-gate G1 so that the control voltage applied to the input terminal 3 of the automobile error correcting (ARQ) channel transmitting equipment KZA (coming from the transmitting memory ZR terminal 1), causes the transmission of an idle time signal. At the same time the transport pulse *Ptr* is suppressed where pulse *Ptr* in the case of a normal character transmission, passes from the output terminal 6 to the register terminal 2 and to the input terminal 10 of the counter. Thus when the transport pulse *Ptr* fails to appear at the input terminal 10, the counter N leaves out one step (see dotted line pulses *Vfa* in FIGS. 2 and 3).

At the receiving end there is a multivibrator MO of the same type as the one MZ used at the transmitting end for generating the *Va*-pulses (see also FIG. 7). This receiver multivibrator MO is controlled by *Pt*-pulses delivered at a rate *Vfa* by the terminal 14 of the automatic error correcting (ARQ) receiving equipment KOA of the radio channel. The *Va*-pulses delivered at the terminal 18 are used for reading out signals stored in the receiving memory OR, and adding to each signal start-stop elements before being conducted to the printer. The signals are recorded in this receiver memory at the rate Vfa via the output terminal 15 of the receiving equipment KOA of the radio channel. Consequently, the signals are written in and read out of the memory at the different speeds Vfa AND Va, respectively, at which the difference counter N at the transmitting end counts forward and backward, respectively.

Thus the state of the difference counter N is a representation of the state of the memory OR at the receiving end. The counter N also regulates the flow of signals, in order to avoid an excess supply of signals being transmitted to the receiver for storage in the memory OR.

Figure 4:
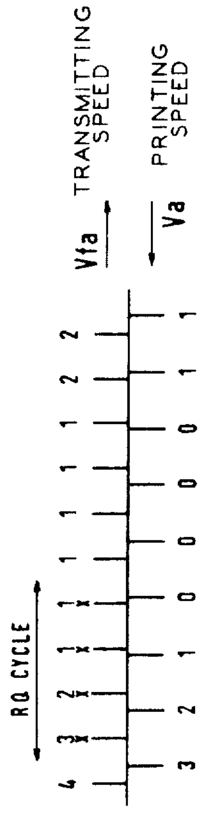
FIG. 4 is a schematic pulse waveform diagram similar to FIGS. 2 and 3 but showing the course of the counting in the case of disturbed reception.

In the case of a repetition cycle, the Vfa-pulses are suppressed for the duration of four character cycles (see "x's " on Vfa-pulses in FIG. 4), but the counter N does not reach the zero state when counting back in response to the Va-pulses. This means that in a five-character memory it can go on sending signals to the printer during one single repetition cycle so that no interruption occurs in the printing operation. Thus the reduction of the effective transmission speed owing to repetitions is compensated for.

Figure 6:
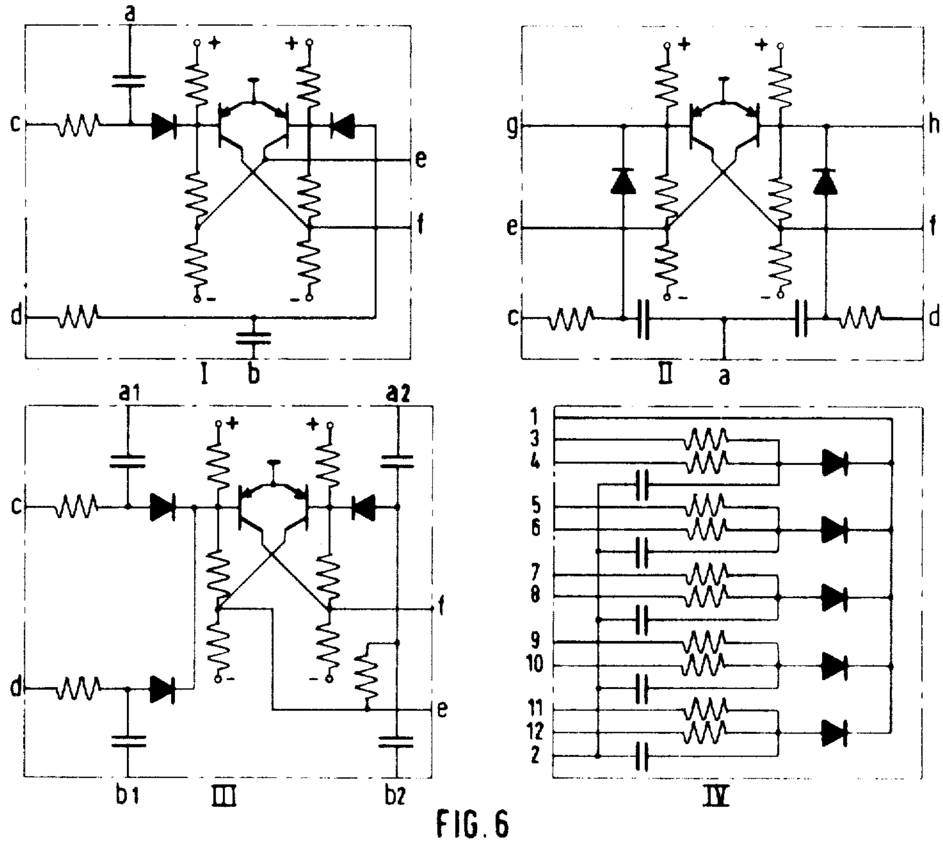

FIG. 5 is a more detailed wiring diagram of the receiver memory OR. This memory OR is built up of four different standard circuits. These circuits, designated by I, II, III and IV are represented in FIG. 6. Circuits I, II, and III are bistable triggers only differing in the control circuits; and circuit IV is a control circuit consisting of a number of gates.

The receiver memory OR is controlled by the timing pulses Vfa and V a. The latter pulses are led from the multivibrator terminal 18 to the receiver memory terminal 19. The V fa-pulses come from the terminal equipment of the radio channel and are suppressed during repetition cycles and when idle time signals are received.

The five-units or elements of each traffic or information signal is obtained from the channel apparatus KOA (terminals 21) and led to the input terminals 22 of the receiver memory OR. The information concerning the polarities of the five elements of each signal is available at the respective c and d terminals of the five triggers A1 through A5 in FIG. 5. This means that under the control of the Vfa-pulse the first signal received is recorded in the trigger group A1—A5. At the next Vfa-pulse, the information signal stored in the triggers A1—A5 is shifted on to the trigger group B1—B5, etc.

Meanwhile, when a fresh traffic signal is being recorded, the reversible register A6—B6—C6—D6—E6 is put in the state 10000 (the term reversible refers to the capability of adding up and subtracting). When a second signal is being recorded and, consequently, the first signal is being shifted to the trigger group B, the register A6—E6 passes to the state 01000. Thus the name or reference character of the trigger put in the 1-state indicates in which trigger group is stored for the first traffic signal to be read into the printer.

Thus, at a reading moment, the e-terminals of the triggers A6—E6 indicate which of the OR gates (G1 to G5 in the IV-circuits) will be used for controlling the output shifting trigger group F1—F5.

When e.g. the B-group of storing triggers B1 through B5 is read, the next signal to be read is in the A-group, if no further signals are supplied. Thus, under the control of the timing pulse Va, the respective output terminals b1 and b2 of the register counters A6—E6 present the configuration 10000.

When one of the reversible register triggers A6—E6 is in the 1-state, this means that a signal has to be read out as a start-stop signal. In this case the trigger P (type in FIG. 6I) receives a precontrol via its c-terminal and is put in the 1-state by a Va-pulse. This o–1 changeover of trigger P causes a potential change at its e-terminal, as a result of which the trigger S (type in FIG. 6II) is put in the 0-state (normal state) via its h-terminal. The e-terminal of the trigger S provides the output terminal 20 of the register F1 through F5 or the memory OR with start polarity.

The trigger P in the 1-state starts a multivibrator M, which generates pm-pulses at intervals of 20 msec. These pm-pulses shift the signal elements stored in the register triggers F1—F5 out of the register via the trigger S. These traffic signal element are determined by a control of the respective input terminals of these triggers from the corresponding group triggers A1—A5 through E1—E5. At the same time the register triggers F1—F5 and S are provided with stop polarity, so that at the end of the character cycle all the triggers F1—F5 and S are in the 1-state (stop). In this case the e-terminals of these triggers F1—F5 and S control the d-terminal of the trigger P, so that this trigger P then takes the o-state again; and stops the multivibrator M and the generator of pm-pulses until the next start-stop traffic signal is to be delivered to the printer.

While there is described above the principles of this invention in connection with specific apparatus, it is to be clearly understood that this description is made only by way of example and not as a limitation to the scope of this invention.

We claim:

1. In an automatic error correcting telecommunication system for multielement binary code signals having a transmitter and a receiver and the automatic error detecting and correcting means for disturbed signals at the receiver, requesting their repetition from the transmitter, and stopping the transmission of further signals until the disturbed signal has been received undisturbed, the improvement comprising: a device for reducing the delay caused by this repetition, comprising:

at said transmitter and said receiver;

a. means (KZA, KOA) for speeding up the rate of transmission of said signals and producing a first series of pulses at this faster rate (Vfa), b. means (MZ, MO) for generating a second series of pulses from said first series of pulses at the normal slower rate (Va) at which the signals are printed at said receiver, and c. memory means (ZR, OR) for storing signals controlled in part by said means for generating said second series of pulses; and at said transmitter:

d. a differential counter (N) for counting a number corresponding to the maximum number of signals which can be stored in the memory means at said receiver, which counter is controlled by both said series of pulses to prevent transmission of more signals than can be stored in said memory means at said receiver.

2. A system according to claim 1 wherein said means for generating said second series of pulses comprises a multivibrator.

3. A system according to claim 1 wherein said memory means at said receiver comprises a plurality of triggers (A1—E5), gates (IV), and shift register (F1—F5, S) for storing each element of each of the number of signals stored therein.

4. A system according to claim 3 wherein said triggers include a trigger (P) for producing stop and start elements for each signal before being conducted to the printer.

5. A system according to claim 3 including a multivibrator (M) for producing pulses for controlling said shift register.

6. A system according to claim 1 including a gate means (G1) between said transmitter memory means and said means for speeding up the rate of transmission controlled by said differential counter, said gate means controlling said transmitter to stop said transmitter and transmit an idle time signal when said counter reaches said maximum number of signals.

(Our Ref. P 169/119)

PO-1050
(5/69)

UNITED STATES PATENT OFFICE
CERTIFICATE OF CORRECTION

Patent No. 3,593,281 Dated July 13, 1971

Inventor(s) Hendrik C. A. Van Duuren and Herman Da Silva

It is certified that error appears in the above-identified patent and that said Letters Patent are hereby corrected as shown below:

Column 1, line 4, sub-title -- Background of The Invention -- should be inserted on this line; line 7, "in" (first occurrence) should read -- is --; line 37, "interval a" should read -- interval. A -- ; line 41, after "applied" insert -- in opposition to each other --; line 47, "pulses" (second occurrence) should read -- pulse -- ; line 69, "device" should read -- circuit -- ; line 72, "according to" should read -- in -- ; line 75, "transmission" should read -- transmitter --. Column 2, line 17, "(see also Fig. 8) N" should read -- N (see also Fig. 8) --; line 24, "pluses" should read -- pulses --; line 57, "automobile" should read -- automatic -- ; line 62, "where" should read -- which -- ; line 64, after "counter" insert -- N -- . Column 3, line 5, "AND" should read -- and -- ; line 67, "o-1" should read -- 0-1 --. Column 4, line 9, "ment" should read -- ments -- ; line 16, "o-state" should read -- 0-state -- .

Signed and sealed this 14th day of March 1972.

(SEAL)
Attest:

EDWARD M.FLETCHER,JR.
Attesting Officer

ROBERT GOTTSCHALK
Commissioner of Patents